Aug. 14, 1923.

R. L. BOWMAN ET AL 1,464,968

MACHINE FOR MAKING PAPER TUBES

Filed March 17, 1921    12 Sheets-Sheet 1

Inventor

R. L. Bowman & C. R. Penn,

By

Attorney

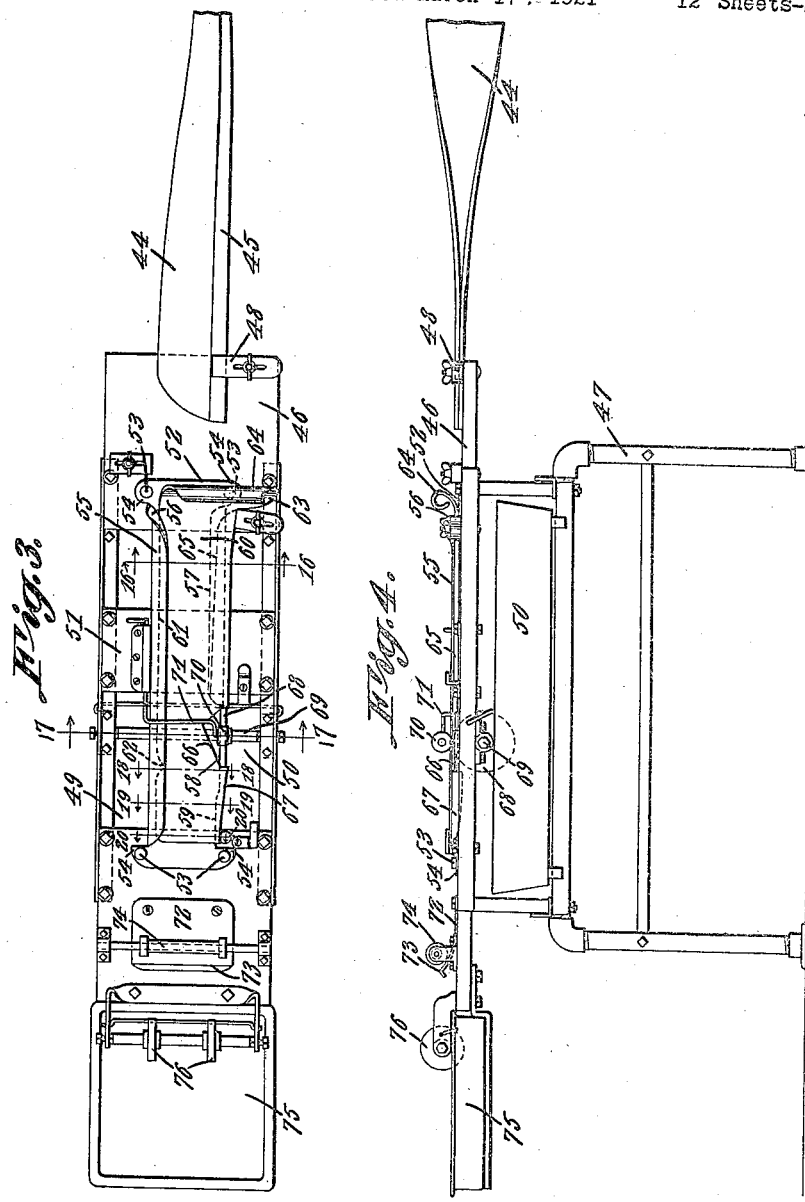

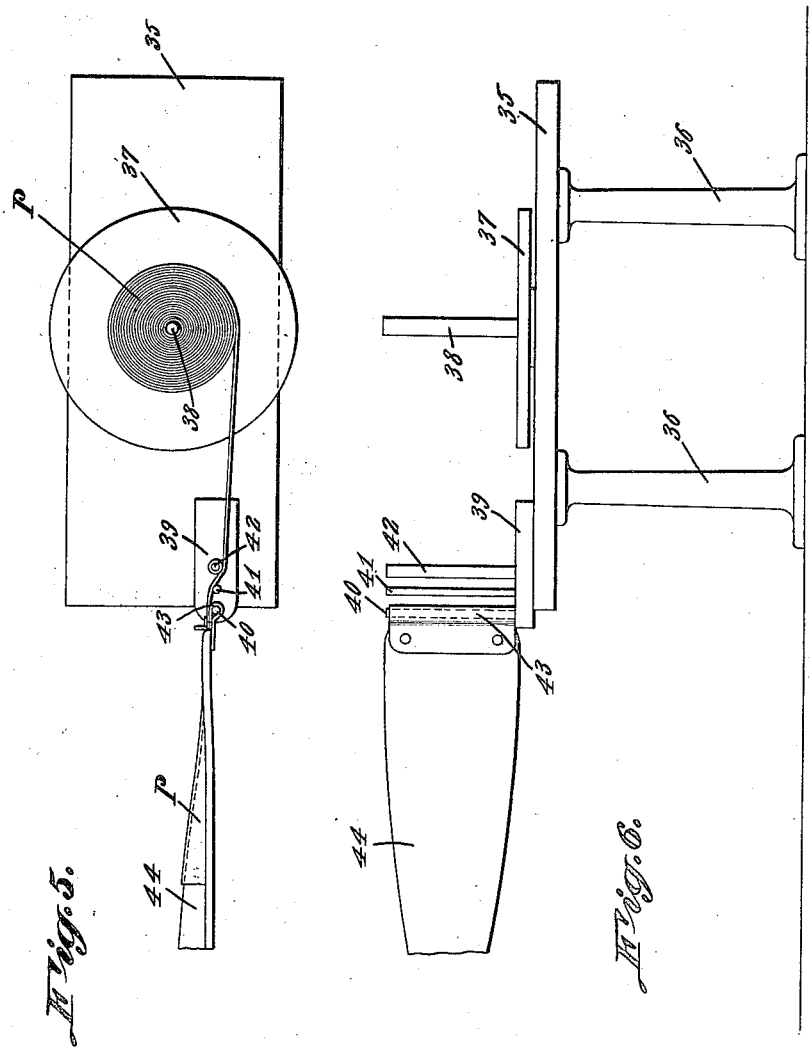

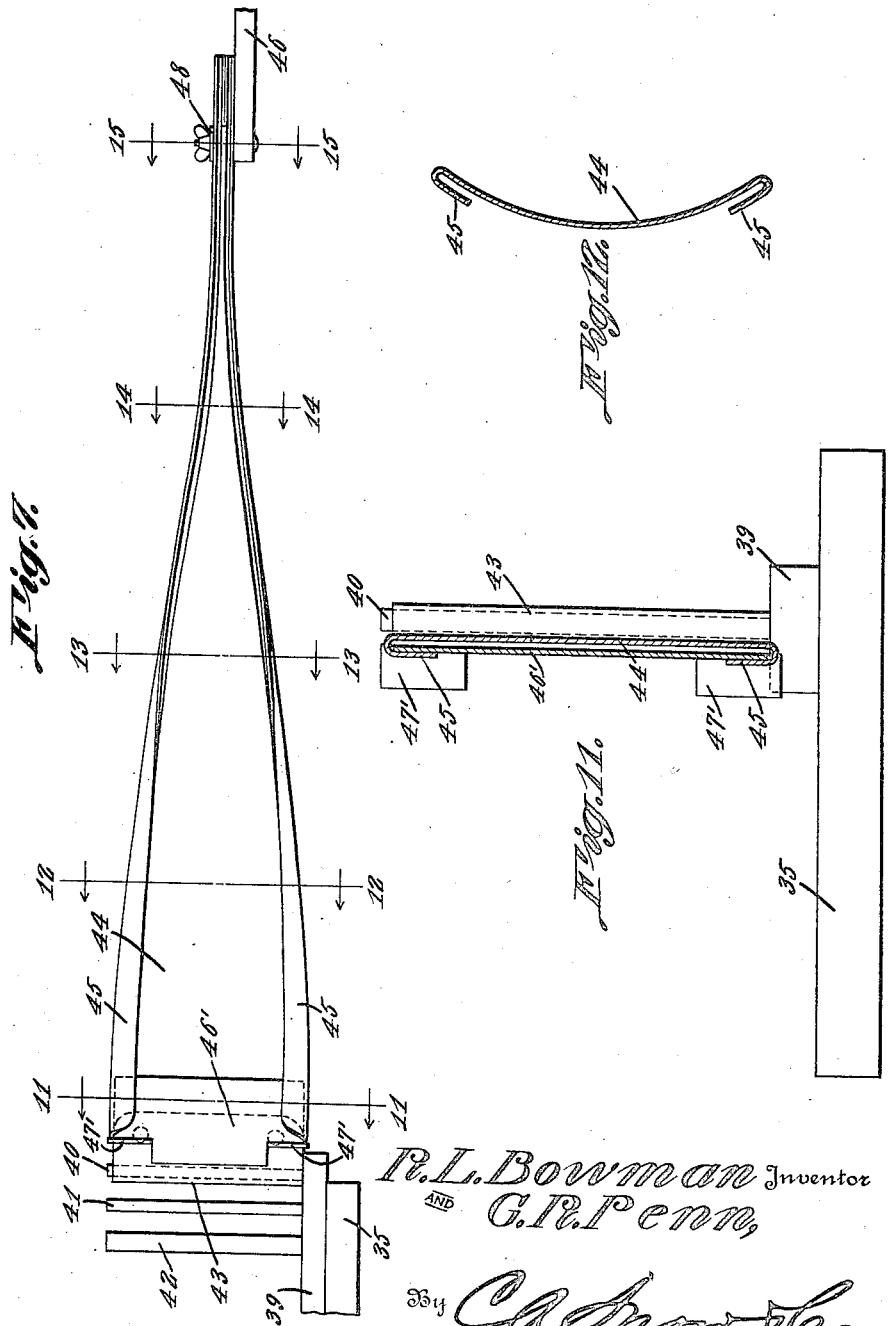

Aug. 14, 1923.
R. L. BOWMAN ET AL
1,464,968
MACHINE FOR MAKING PAPER TUBES
Filed March 17, 1921   12 Sheets-Sheet 5
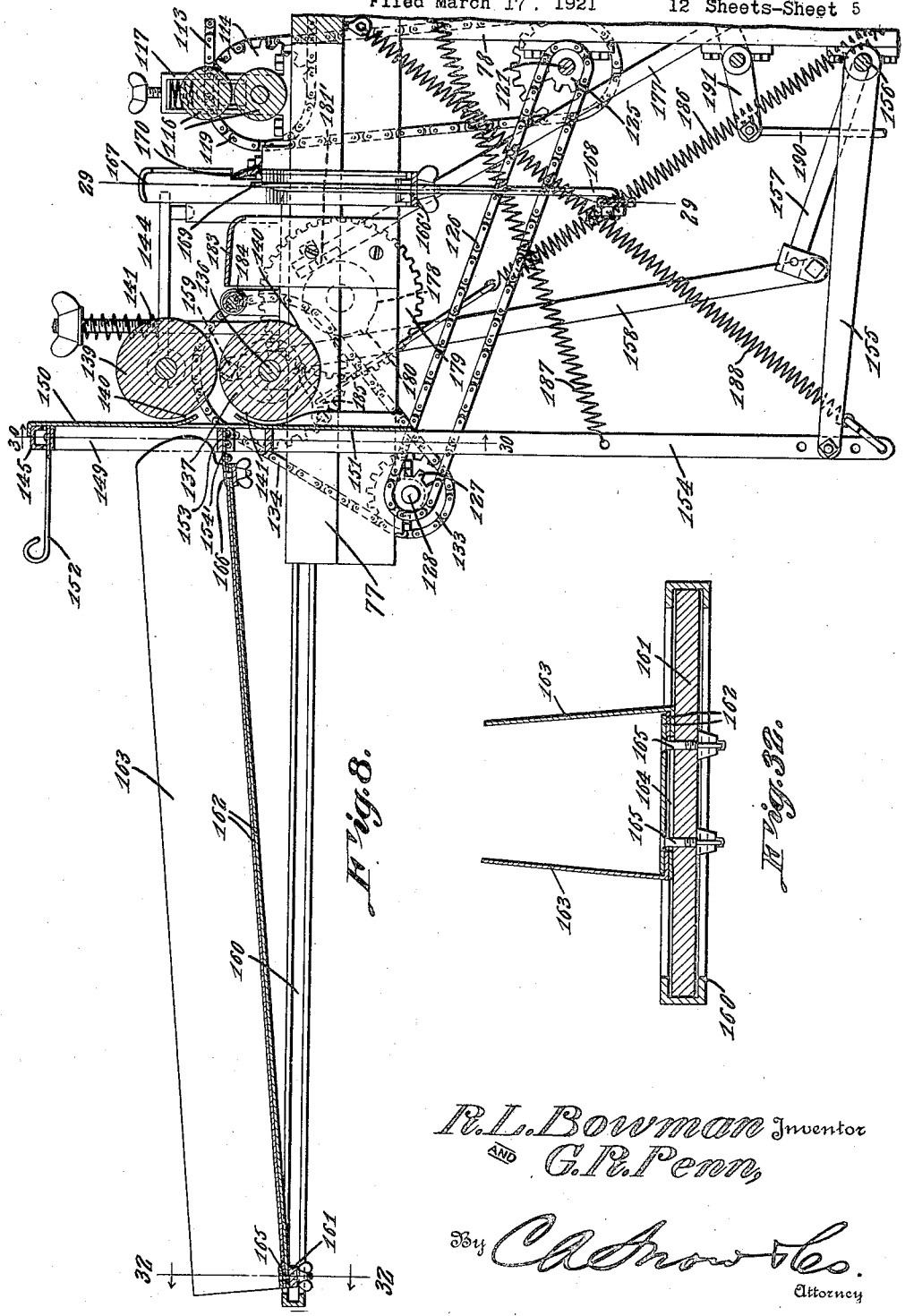

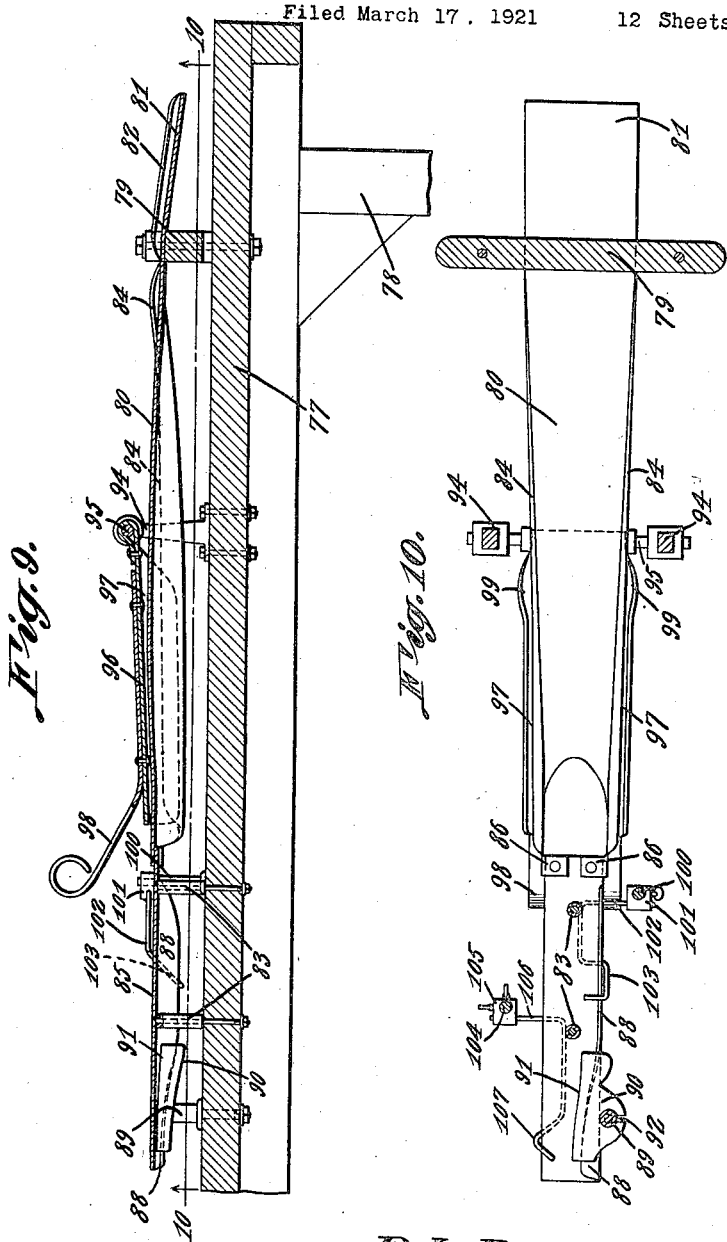

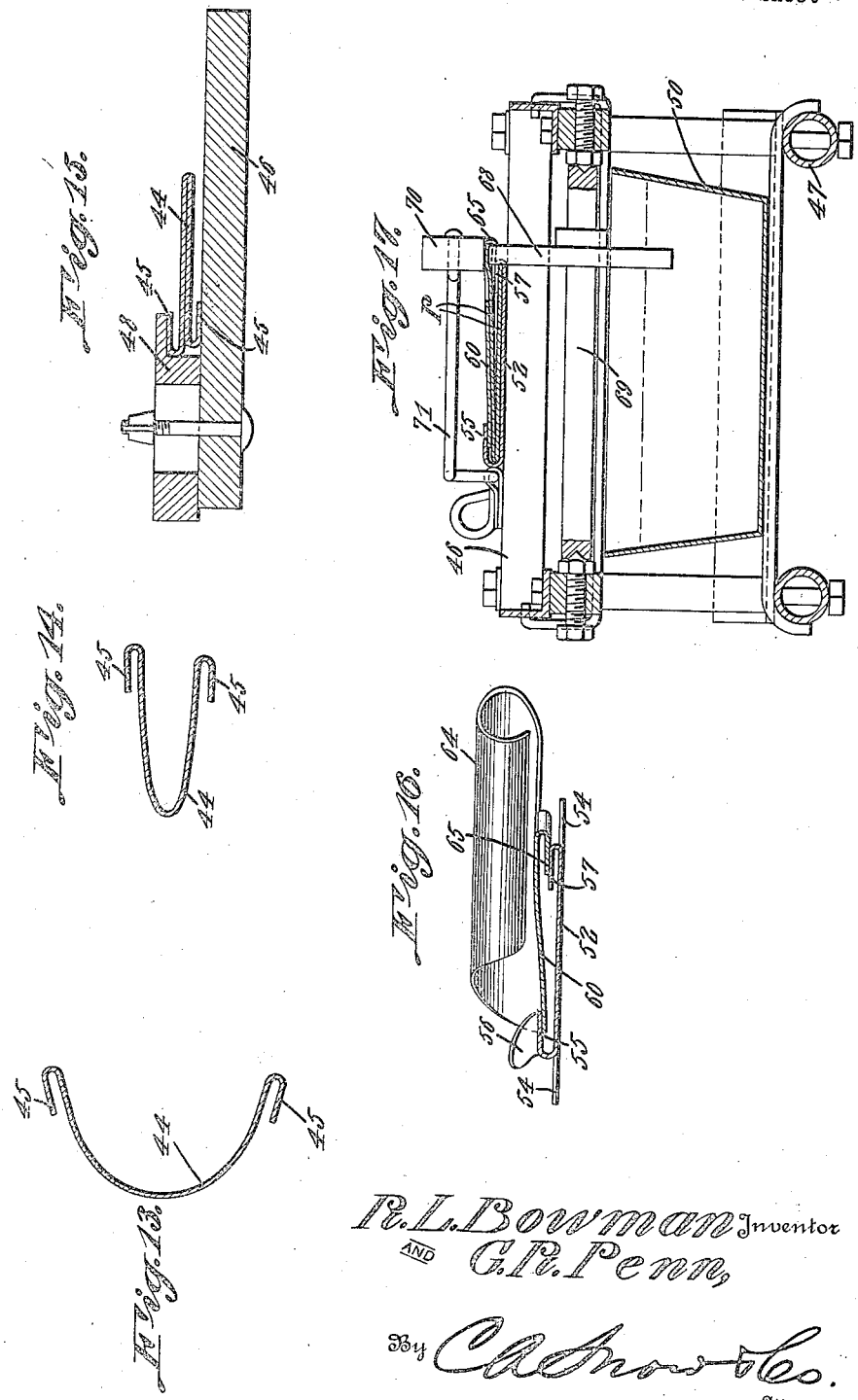

Aug. 14, 1923.
R. L. BOWMAN ET AL
1,464,968
MACHINE FOR MAKING PAPER TUBES
Filed March 17, 1921   12 Sheets-Sheet 8
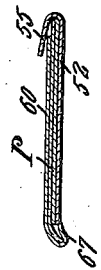
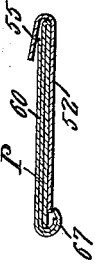
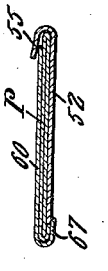
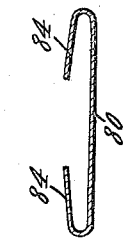
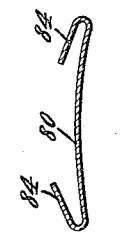
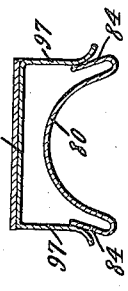

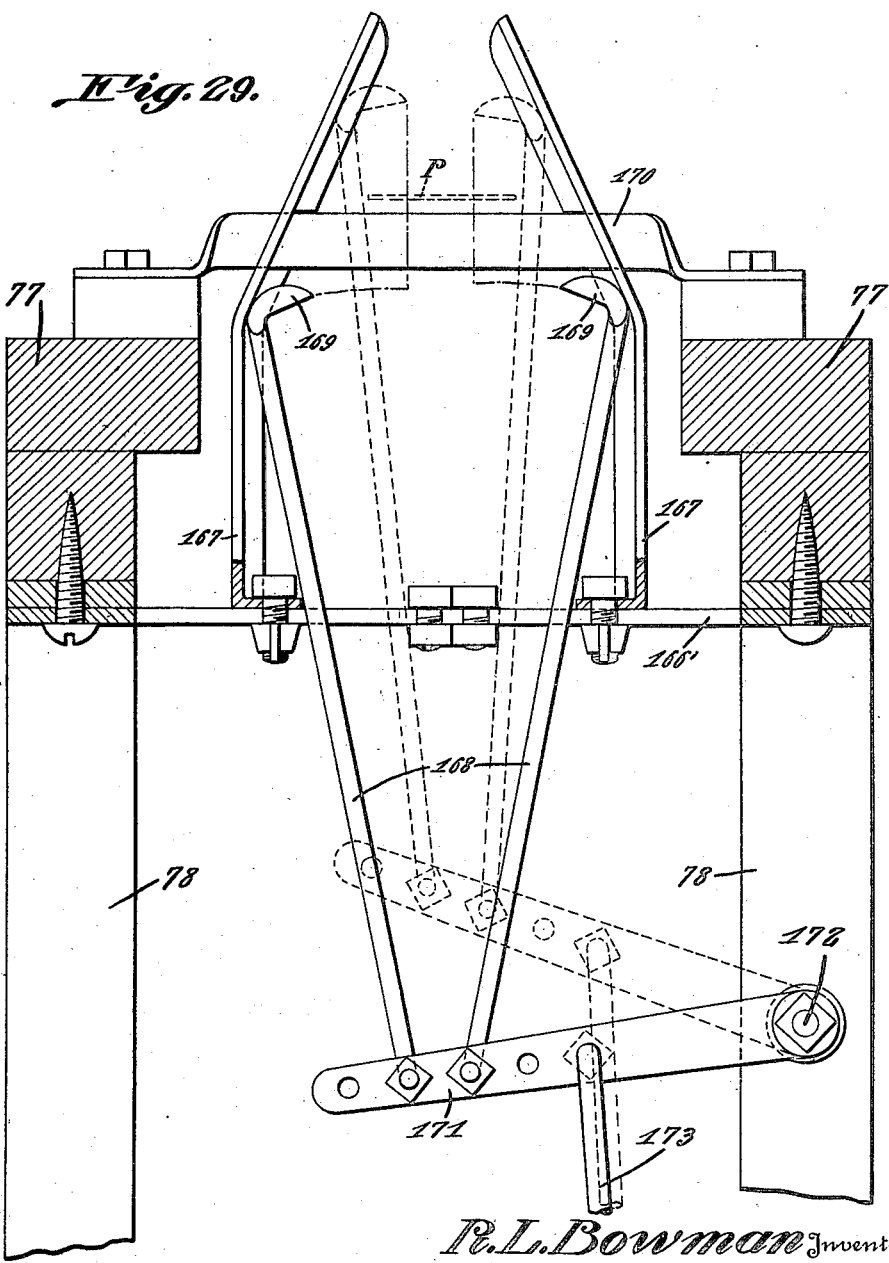

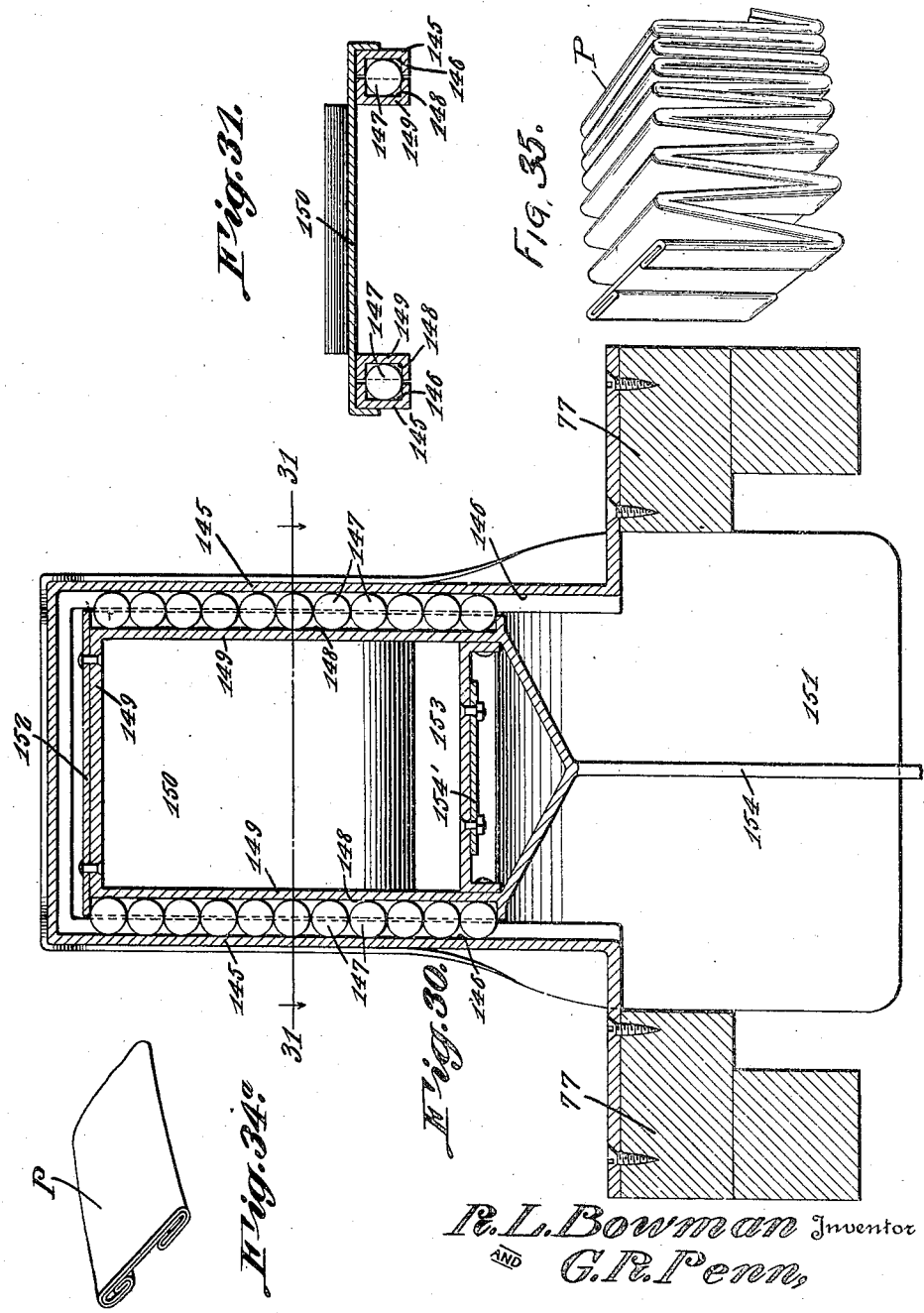

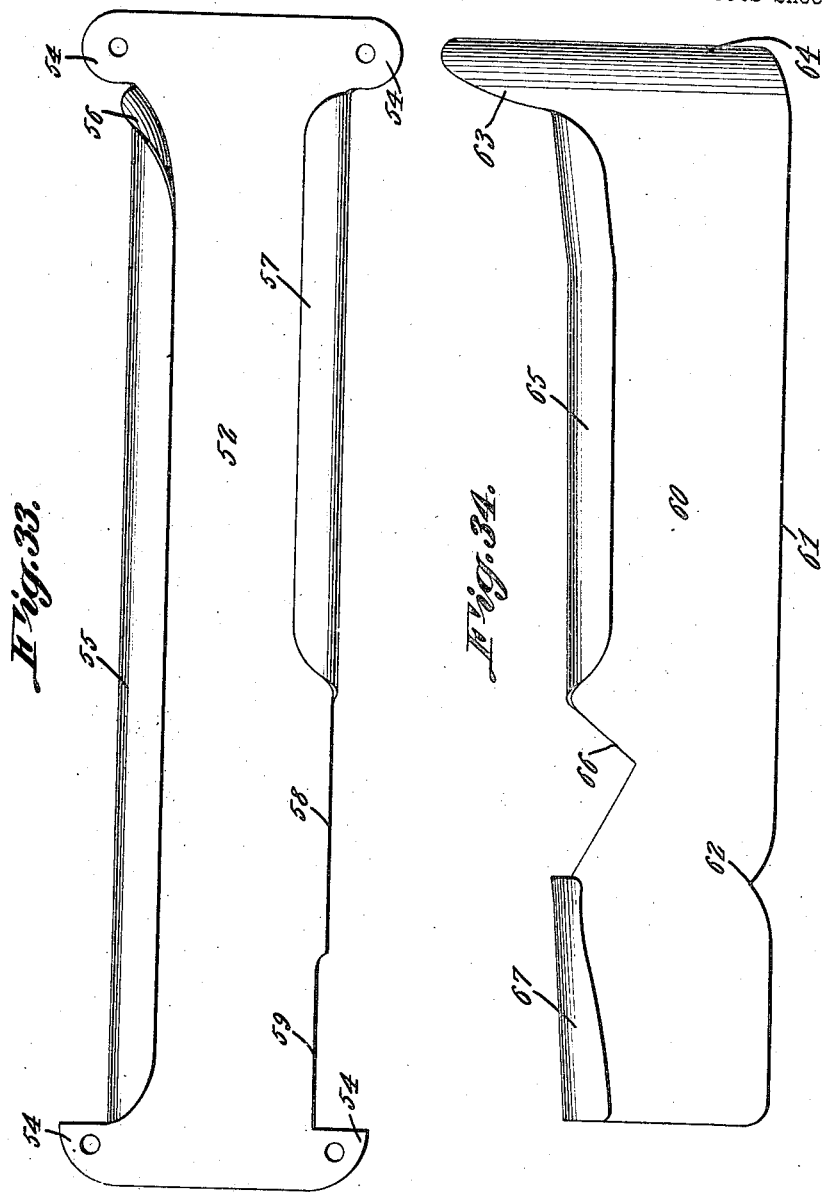

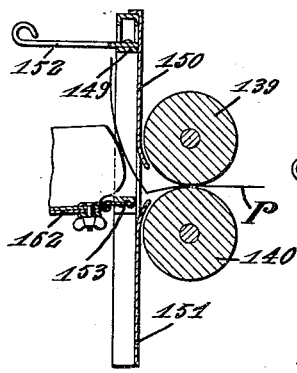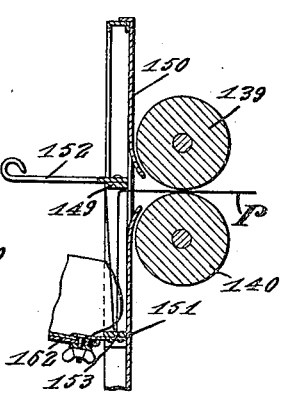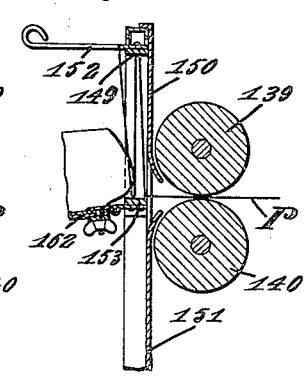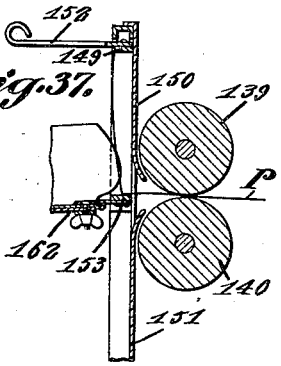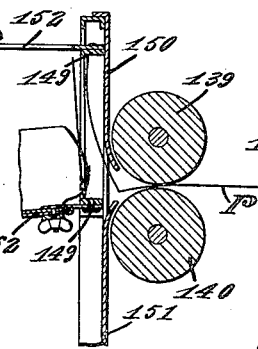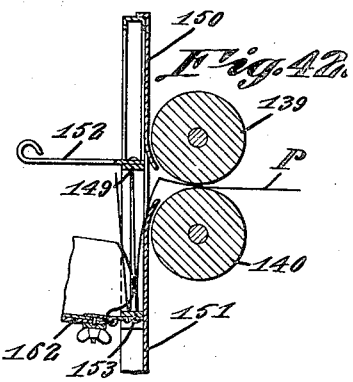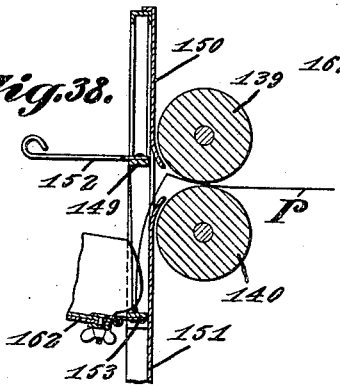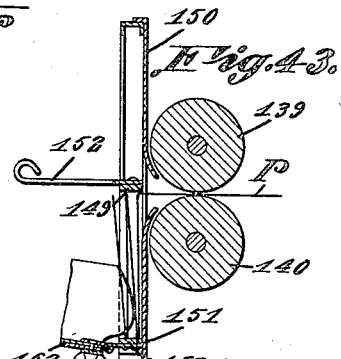

Patented Aug. 14, 1923.

1,464,968

UNITED STATES PATENT OFFICE.

ROBERT L. BOWMAN, OF KNOXVILLE, TENNESSEE, AND GEORGE R. PENN, OF WASHINGTON, DISTRICT OF COLUMBIA, ASSIGNORS TO SAID ROBERT L. BOWMAN.

MACHINE FOR MAKING PAPER TUBES.

Application filed March 17, 1921. Serial No. 452,999.

*To all whom it may concern:*

Be it known that we, ROBERT L. BOWMAN, a citizen of the United States, residing at Knoxville, in the county of Knox and State of Tennessee, and GEORGE R. PENN, a citizen of the United States, residing at Washington, in the District of Columbia, have invented a new and useful Machine for Making Paper Tubes, of which the following is a specification.

This invention relates to a machine for making paper tubes and is primarily designed for making adjustable tubes to be used in the formation of blasting cartridges although it is to be understood that the machine can also be employed for making tubes for various other purposes such as those to be used in packaging materials, in making paper bags, and the like.

One of the objects of the invention is to provide a machine through which a web of paper can be pulled continuously, this paper during such movement being given the proper folds to produce a tube of the desired cross sectional configuration.

Another object is to provide means whereby the paper tubes can be cut to predetermined lengths, that portion of the tube in each length being folded automatically so as to be delivered from the machine in package form and in a predetermined length.

A still further object is to provide a machine which can operate at a high speed and which has interchangeable formers whereby the transverse configuration of the tube produced can be varied at will both as to size and shape.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a plan view of the finishing unit of the machine.

Figure 2 is a side elevation thereof.

Figure 3 is a plan view of the intermediate unit of the machine.

Figure 4 is a side elevation thereof.

Figure 5 is a plan view of the feeding unit of the machine.

Figure 6 is a side elevation thereof.

Figure 7 is an elevation of the initial former extending from and forming a part of the feeding unit, said figure illustrating that side of the former opposite to the one shown in Figure 6.

Figure 8 is a section on line 8—8, Figure 1.

Fgure 9 is a section on line 9—9, Figure 1.

Figure 10 is a section on line 10—10, Figure 9.

Fig. 11 is an enlarged section on line 11—11, Figure 7.

Figure 12 is an enlarged section on line 12—12, Figure 7.

Figure 13 is a section on line 13—13, Figure 7.

Figure 14 is a section on line 14—14, Figure 7.

Figure 15 is a section on line 15—15, Figure 7.

Figure 16 is a section on line 16—16, Figure 3.

Figure 17 is a section on line 17—17, Figure 3.

Figure 18 is a section on line 18—18, Figure 3.

Figure 19 is a section on line 19—19, Figure 3.

Figure 20 is a section on line 20—20, Figure 3.

Figure 21 is a section on line 21—21, Figure 1.

Figure 22 is a section on line 22—22, Figure 1.

Figure 23 is a section on line 23—23, Figure 1.

Figure 24 is a section on line 24—24, Figure 1.

Figure 25 is a section on line 25—25, Figure 1.

Figure 26 is a section on line 26—26, Figure 1.

Figure 27 is a section on line 27—27, Figure 1.

Figure 28 is a section on line 28—28, Figure 1.

Figure 29 is an enlarged section on line 29—29, Figure 8.

Figure 30 is a section on line 30—30, Figure 8.

Figure 31 is a section on line 31—31, Figure 30.

Figure 32 is a section on line 32—32, Figure 8.

Figure 33 is a plan view of the lower former mounted on the intermediate unit shown in Figure 3.

Figure 34 is a bottom plan view of the upper former used in connection with the former shown in Figure 33.

Figure 34ª is a perspective view of a portion of a paper tube.

Figure 35, is a perspective view of a portion of a paper tube showing several folds.

Figures 36 to 43 inclusive are sectional views more or less in diagram showing the successive steps followed in the formation of the zig-zag folds in the tube.

The machine constituting this invention is preferably made up of three distinct units adapted to be assembled in line to form the complete machine. The first of these units to be considered in tracing the course of the paper from one end of the machine to the other is the feeding unit illustrated in Figures 5, 6, 7, and 11 to 15 inclusive. This unit includes a table 35 mounted on suitable supports 36 and carrying a rotatable disk 37 and spindle 38 on which is to be placed the roll of paper, indicated at P. A bracket 39 is secured on the table 35 at one end and has an upstanding spindle 40 adjacent which are upstanding guides 41 and 42. The guide 42 is in the form of a roller or sleeve whereby friction on the paper web is materially reduced as will be hereinafter explained.

Pivotally mounted on the spindle 40 is a sleeve 43 provided at one end of a forming plate 44. At its point of connection with the sleeve 43 the plate is flat from top to bottom, as shown especially in Figure 11 and has its upper and lower edges turned toward each other to provide flanges 45. A guide plate 46′ is arranged parallel with the flat end portion of the former 44 and is held in place by the inturned flanges 45, there being sufficient space between the former 44 and the plate 46′ to receive the paper web to be shaped. The guide plate 46′ is extended beyond the adjacent ends of the flanges 45 as shown in Figure 7 and has the upper and lower corner portions of the extended part bent laterally to provide wings 47′.

The former 44 is bulged laterally between the flanges 45, this bulging gradually increasing as will be seen by referring to Figures 12, 13 and 14 and continuing until the former is completely folded together along a longitudinal line as illustrated in Figure 15 with the upper flanged edge of the former extending laterally slightly beyond the lower flanged edge. Thus it will be seen that a web of paper passing from the roll shown in Figure 5 will enter between the guides 41 and 42 and will then pass between the former 44 and the guide plate 46′ at which point the paper web will be perfectly flat. As the web moves along the former, however, it will assume the contour of the convex surface of the former so that as the web passes from the former adjacent the point illustrated in Figure 15 it will be completely folded longitudinally with one longitudinal edge seated in the channel formed under the upper flange 45 and the other longitudinal edge seated in the channel formed by the lower longitudinal flange 45, the upper edge of the web obviously projecting laterally a short distance beyond the lower edge of the paper web.

The second unit to be considered and which constitutes the intermediate unit of the machine has been illustrated in Figures 3, 4, 16 to 20 inclusive, and Figures 33 and 34. This unit, which is placed in line with the unit hereinbefore described, includes a table 46 provided with a suitable supporting frame 47. One end of the table supports the folded or delivery end of the former 44, the flanged edges of this former being held on the table by an adjustable clamp 48 shown particularly in Figures 3 and 15. An opening 49 is formed in the top of the table 46 above a removable pan 50 or other container for holding glue and extending transversely across this opening is a plate 51 on which is mounted the intermediate portion of a lower former 52 shown in detail in Figure 33. This former is in the form of an elongated metal strip extending longitudinally of the table and over the opening 49 and having its ends secured to the table by means of fastening devices 53 extending through laterally projecting terminal ears 54. That side of the former 52 which is substantially in line with the intermediate fold of the former 44 has an overhanging longitudinal flange 55 the receiving end of which is curved upwardly and laterally to provide a deflecting ear 56. The other side of the former 52 has an overhanging longitudinal flange 57 extending along a portion of the length thereof and the remaining portion of said edge of the former is extended straight for a predetermined distance, as illustrated at 58 and cut away longitudinally as shown at 59.

Arranged above the lower former 52 is an upper former 60 shown in detail in Figure 34. This former extends longitudinally above the former 52 and has one straight longitudinal edge 61 insertable under the flange 55 as shown in Figure 16. A notch or recess 62 can be provided in the straight edge 61. The receiving end of the former 60 has a laterally extending tongue 63 and this tongue, as well as the end portion of the former is turned upwardly to provide a deflector 64 which, as shown in Figure 16, extends laterally beyond the two formers 52 and 60. A longitudinal flange 65 of substantially the same length as the flange 57 is inturned along the former 60 and bears downwardly on the flange 57 as shown in Figure 16, the flange 65, however, projecting laterally a short distance beyond the flange 57. The flange 65 terminates at one end close to the tongue 63 and at its other end at a notch 66 which is cut into the former 60. Another flange 67 is provided between the notch 66 and the delivering end of the former 60. As shown in Figures 18, 19 and 20 this flange 67 is supported laterally beyond the adjacent edge of the former 52 and is curved transversely to produce a fold in a paper web drawn between the former and which web has been indicated at P in Figures 18, 19 and 20. Thus when the folded web is delivered to the intermediate unit from the former 44 the edge portions of the web will be received within the channels formed by the flanges 57 and 65 as illustrated in Figure 16. The upper edge, as before explained, projects laterally beyond the lower edge of the folded web P and when it passes from over the flange 65 it will be momentarily exposed beyond the straight edge 58 and under the notch 66. Said projecting edge of the web will then pass over the flange 67 which, by reason of its peculiar transverse configuration as illustrated in Figures 18, 19 and 20 will gradually turn the upper projecting edge of the web downwardly and inwardly so that it will come under the other edge of the paper web as illustrated particularly in Figure 20.

If it is desired to glue the lapping edges of the paper web together when brought to the position illustrated in Figure 20, the projecting edge of the web, while passing under the notch 66 can come into engagement with a wheel or disk 68 which projects into the pan 50 and is supported by a transverse shaft 69. A presser roller 70 can be supported above the disk 68 by a spring arm 71 secured to the plate 51 and this roller 70 will serve to press the projecting edge of the paper web downwardly on the disk 68 so as to cause the disk to rotate as the web is drawn through the machine and thus apply glue to the projecting edge. It has been found that under some conditions it is not necessary to use the roller 70 in order to insure proper contact of the edge of the paper web with the wheel or disk 68.

As the folded web moves from between the delivering ends of the formers 52 and 60 with its edges lapping as shown in Figure 20 it passes over a resilient, curved plate 72 provided with a straight transverse shoulder 73 constituting a friction head. A roller 74 is extended transversely above this plate and extends below the edge or shoulder 73 so that as the folded paper web is drawn between the plate 72 and the roller 74 it will drag over the shoulder 73 and thus compress the web along the folds thereof so as to produce scores along the folds.

A supplemental pan or container 75 may be supported at the delivery end of the table 46 and disks or wheels 76 can be extended thereinto. These wheels or disks project into the container and are adapted to engage the opposed edge portions of the folded web, thus to apply glue thereto if so desired.

The third unit of the machine to which the paper web is fed during its passage through the machine has been illustrated in Figures 1, 2, 8, 9, 10, and 21 to 32 inclusive. This unit includes a table 77 mounted on a suitable supporting structure 78 and adapted to be placed in line with the table 46 of the intermediate unit. Secured on the receiving end portion of this table 77 is a cross strip 79 on which is mounted a former consisting of an elongated strip 80. That portion of this former strip 80 projecting from the cross strip 79 toward the intermediate unit is inclined downwardly toward said intermediate unit, as shown at 81 and is provided along its sides with inturned flanges 82 forming channels for the reception of the creased sides or edges of the flat tube already formed from the folded paper web. The former strip 80 is extended longitudinally along a portion of the table 77 and is provided with supports 83 wherever the same are found to be desirable. This former strip is provided with side flanges 84 which extend from points adjacent the cross strip 79 to points back from that end of the strip 80 remote from said cross strip 79. As shown particularly in Figure 21 that portion of the former strip 80 adjacent the cross strip 79 is flat and has its side flanges extending thereover. The former strip is gradually bulged upwardly as shown in Figures 22 and 23 so that the flanges 84 are ultimately brought to upwardly extending positions with the bowed portion of the former strip 80 extending upwardly therebetween. From the point indicated by line 23—23 and shown in Figure 23 the former strip 80 gradually merges into a rectangular shape as illustrated in Figure 25 wherein the flanges 84 and the adjacent portions of the strip 80 are extended downwardly perpendicularly to the intermediate portion of the strip. The flanges terminate just beyond this point, as shown in Figures 1 and 2.

The former plate or strip 80 is provided with an extension 85 which can be integral with the strip 80 or, as shown in Figures 9 and 10, can be made separate therefrom, the said strip 80 and extension 85 lapping and there being inturned ears 86 upon the strip 80 which extend under the extension so as to hold the parts assembled. The extension 85 is of a width substantially equal to the distance between the sides of the channel 87 formed under the end portions of the strip 80, as shown in Figure 25 and formed along one edge of this extension is a depending flange 88 which gradually turns inwardly under the extension as shown in Figures 26, 27 and 28 and in Figure 10. A support 89 is located on the table 77 adjacent the delivery end of the extension 85 and mounted on this support is a guide plate 90 which extends under the flange 88 and has a flange 91 which is gradually curved from an upstanding position as shown in Figure 26 laterally to position between the flange 88 and extension 85 until it assumes a channeled shape spaced from but interlocking with the flange 88, as shown in Figure 28. This plate 90 can be adjusted laterally relative to the support 89 as will be apparent by referring to Figure 27 wherein a slot 92 is shown in the plate for the reception of a clamping screw 93.

Standards 94 are mounted on the table 77 at opposite sides of the former strip 80. Mounted in these standards is a cross pin 95 on which an upper former strip 96 is mounted to swing. This former strip 96 is provided with side flanges 97 adapted to bear downwardly on the flanges 84 and having their lower edges outturned as shown particularly in Figures 24 and 25. A finger piece 98 can be secured on the upper former 96 so that the same can be readily swung upwardly out of position astride the lower former strip 80.

As shown in the drawings those ends of the flanges 97 at the receiving end of the upper former 96 are curved laterally to constitute deflectors 99.

A post 100 is mounted adjacent one side of the extension 85 and has a block 101 adjustably mounted thereon. This block carries a spring finger 102 supported above the extension 85 and terminating in a yoke 103 which straddles the flanged side of the extension 85 so as to form a pleater. Another post 104 is mounted on the table at the opposite side of the extension 85 and carries an adjustably mounted block 105 in which is mounted a spring finger 106. This finger is extended above and along the extension 85 and terminates in a yoke 107 which straddles the adjacent side portion of the extension 85 close to the free end thereof. A transversely extending roller 108 is located adjacent and beyond the free end of the extension 85.

It will be apparent that when the flat paper tube is drawn along the formers carried by the unit shown in Figures 1 and 2 the folded portions or edges of the flat tube will be received under the flanges 82 and then guided under the flanges 84. The flat tube will then be bowed transversely by the bowed portion of the former 80 so that the folded sides or edges of the tube will be turned downwardly by the flanges 84 and ultimately be brought to upstanding positions within the channels formed along the flanges 84 and between the flanges 97 of the top former 96. This will be apparent by referring to Figure 25. During the continued movement of the tube along the formers one of the downturned side portions of the tube will travel along the outer side of the flange 88 and be brought against the pleater yoke 103 which will turn the lower part of said downturned portion inwardly under the flange 88 and to position to enter the space above the guide plate 90 and the flange 88 shown in Figure 26. The further forward movement of the tube will result in this edge portion of the tube being bent or folded inwardly. While a double fold is thus being made along one side of the flat tube the other downwardly projecting side of the tube will pass over the pleating yoke 107 which will turn said edge inwardly under the extension 85. Thus as the tube leaves the extension 85 it will have one side portion folded inwardly and the other side portion shaped into a double fold, the resultant tube being such as illustrated in Figure 34ª.

As the formed tube leaves the extension 85 it passes over the roller 108 which thus serves to condense or crease the tube along the several folds after which the tube passes between superposed pressure rolls 109 carried by standards 110.

Secured to the shaft 111 of one of the rolls 109 is a sprocket 112 adapted to receive motion through a chain 113 from a sprocket 114 secured to the shaft 115 of one of a pair of superposed pressure rollers 116. These rollers are supported between standards 117 and are spaced from and parallel with the rolls 109. Another sprocket 118 is secured to the shaft 115 and is designed to receive motion through a chain 119 from a sprocket 120 secured to a transverse shaft 121. A belt wheel 122 is secured to the shaft 121 and receives motion through a belt 123 from a motor 124 or other source of power.

Secured to the shaft 121 is a sprocket 125 adapted to transmit motion through a chain 126 to a sprocket 127 secured to a transverse shaft 128 journaled in one side portion of the table 77 at the delivery end thereof. Collars 129 are secured to this shaft 128 and have springs 130 extending therefrom for forcing washers 131 or the like against the ends of the hub 132 of a sprocket 133. This sprocket is loosely mounted on shaft 128 and rotates therewith under normal conditions. When, however, the rotation of the sprocket is resisted to a predetermined extent, the shaft 128 will rotate independently of the sprocket by reason of the slip connection between the hub 132 and the washers 131.

A chain 134 transmits motion from the sprocket 133 to a sprocket 135 secured to the shaft 136 of a creasing roll 137. This shaft is journaled in suitable bearings 138 provided therefor and its roll 137 is located under and cooperates with another creasing roll 139. Each of these rolls 137 and 139 has a longitudinal rib 140 and a longitudinal groove 141, the parts being so proportioned that during the rotation of the rolls in opposite directions, the ribs 140 will project into the grooves 141 so that the folded paper tube while passing between and being pressed by the rolls 137 and 139 will be creased transversely in opposite sides respectively by these ribs entering the grooves. The parts are proportioned to crease the tube at regular intervals, the distances between the creases being preferably of a standard length. As shown in Figure 2 the rolls 137 and 139 are provided with gears 142 and 143 to insure the rotation of the rolls in properly timed relation. The upper roll 149 is preferably mounted in spring pressed bearings 144 (see Figures 2 and 8) so as to insure the proper degree of pressure upon the folded tube by the rolls.

Mounted on the table 77 between the creasing rolls 137 and 139 and the adjacent end of the table is an upstanding guide frame 145 having channels 146 in the sides thereof for the reception of anti-friction balls 147 or the like. These balls are seated within recesses 148 formed longitudinally within the sides of a frame 149 mounted for vertical reciprocation and which frame is located close to the creasing rolls 137 and 139 and extends substantially throughout the length of the rolls. Guard plates 150 and 151 are attached to the frame 145 and are spaced apart at their adjoining ends, so that as the creased tube is directed outwardly from between the rolls 137 and 139 it will pass between these ends of the plates 150 and 151. The reciprocating frame 149 is provided at its top with a guard plate 152 and the bottom of the frame, which has been indicated at 153, has a ledge 154' extending therefrom. A hanger 154 extends downwardly from the reciprocating frame and its lower end portion is adjustably and pivotally connected to an arm 155 extending from a rock shaft 156. Another arm 157 is connected to this rock shaft and has a pitman 158 connected thereto and to a wrist pin 159 extending from the sprocket 135.

A supporting frame 160 is extended from the delivery end of the table 77 and is slidably engaged by a cross bar 161. Adjustably mounted on this cross bar are the lapping bottom sections 162 of side members each of which has an upwardly extending flange 163 at its outer edge. The bottom sections are slotted transversely as shown at 164 for the reception of clamping bolts 165 engaging the bar 161 and additional clamping bolts are similarly engaged with the bottom sections 162 at the other ends thereof and serve to clamp said bottom sections to a leaf 166 hinged to the member 153. Thus it will be seen that the trough produced by the two flanged members can be adjusted to any desired width so that its flanges or side walls 163 will frictionally engage the side edges of the folded tube directed into the trough. It is to be understood that the trough, the side flanges or walls of which converge upwardly slightly can be of any desired length.

Obviously when the mechanism is working the frame 149 will be reciprocated vertically. Thus as a flattened tube is fed from between the creasing rolls 137 and 139 the projecting end portion thereof will be engaged by the adjacent ends of the walls or flanges 163 and directed upwardly into the frame 149, as shown in Figure 36, so as to come against the top of said frame or against the guard plate 152, as shown in Figure 37. Then as the frame 149 moves downwardly it will thrust against the upstanding portion of the tube, as shown in Figure 38, and push downwardly within the frame that portion of the tube delivered from between the creasing rolls, as shown in Figure 39. The frame 149 when again moved upwardly comes against the lower folds of the tube, as shown in Figure 40, and again press the tube upwardly so that the tube will thus be formed into a zigzag fold, as shown in Figure 41, the side edges of the tube frictionally engaging the walls or flanges 163 of the trough. As the trough moves upwardly and downwardly with the frame the package formed by the folded tube will be received by the trough and will be fed therealong, said package in its folded position being delivered ultimately from the outlet end of the trough. The zigzag folding of the paper tube is facilitated by the formation of the creases in opposite faces successively of the tube, these creases being produced by the ribs 140 and the groove 141 carried by the rolls 137 and 139. A package such as produced by the operation above described is illustrated in Figure 35. Such a package is also shown in the course of formation in Figures 42 and 43.

Any desired means may be provided for cutting the tube so that the same will be formed into packages of a predetermined length or bulk. One means for cutting the tube has been illustrated in detail in Figures 8 and 29. This cutting mechanism includes a cross strip 166' on which are secured opposed longitudinally channeled guide fingers 167 the upper portions of which converge upwardly. Slidably mounted between these guide fingers are upwardly diverging arms 168 provided at their upper ends with inwardly extending points 169 which normally engage the channeled guide fingers below the inclined portions of the fingers. A guide plate 170 extends up to the inclined portions of the fingers and serves to present a straight edge along which the tube will be cut as hereinafter explained.

The lower ends of the rods 168 are adjustably and pivotally connected to an arm 171 pivotally connected to the frame as indicated at 172. This arm, in turn, is connected by a depending rod 173 to a lever 174 fulcrumed as at 175 between its ends. That end of the lever 174 remote from the rod 173 is connected by a spring 176 to the table 77 and has a channeled strip 177 pivotally connected to it. The upper portion of this strip 177 rests upon the hub 178 of a gear 179 and on this hub is mounted a projecting lug 180 adapted, during the rotation of the hub and gear, to move against an abutment 181' secured in the channels in strip 177. A spring 182' connects the lower portion of the strip 177 to the table 77 so as to press the upper portion of the strip 177 against the hub 178.

A disk 181 rotates with the sprocket 135 and has a series of laterally extending pins 182 one or more of which can be removed. These pins during the rotation of the disk 181 engage the gear 179 so as to rotate it slowly and as this gear is rotated the ear or projection 180 gradually moves against abutment 181' and slowly forces the strip 177 downwardly against the action of the springs 176 and 182'. Lever 174 is thus gradually raised so as to thrust upwardly against lever 171 and cause the rods 168 to move upwardly along the inclined portions of the guide fingers 167. Thus the points 169 will be moved past the sides of the paper tube and will then be deflected inwardly so that the points 169 will overhang the side portions of the tube. Just as the points are elevated to this position the proper length of tube will have been measured off and the ear or projection 180 will move out of engagement with the abutment 181'. Consequently the springs 176 and 182' will return the various parts to their initial positions. This will result in the rods 168 being snapped downwardly at a high speed, causing the points 169 to tear through the side portions of the tube and to then swing apart against the fingers 167 as shown in Figure 29. The creasing rolls 137 and 139 are designed to move at such a speed that they, in cooperation with rolls 109 and 116, will pull the entire paper web throughout the length of the machine over and between the formers and between the compressing rolls. In view of the slip connection between the sprocket 133 and its shaft the creasing rolls will at no time rotate as rapidly as the shaft 128 would otherwise demand. However, when the tube is partially cut in the manner described, the pulling action exerted by the creasing rolls will be sufficient to rupture the tube between the two side cuts with the result that the tube will be severed in the predetermined lengths and the entire length then directed in its folded condition along the trough followed by another length properly folded in the manner hereinbefore pointed out. When the points 169 are snapped downwardly they work along and past the straight edge 170 which serves to support the tube during the severing operation.

If desired a guide plate 183 may be interposed between the straight edge and a guide roll 184 located adjacent the pass between the creasing rolls 137 and 139.

In order to prevent retrograde movement of the creasing rolls and of the gear 179, a dog 185 is slidably engaged by the teeth of the gear 179 during the actuation of said gear in the manner hereinbefore described, the dog being held in engagement with the teeth by a spring 186. Additional springs 187 and 188 may be connected to the hanger 154 and to the table for facilitating the reciprocation of the frame 149.

Importance is attached to the fact that during the operation of the machine the paper web after being passed through the machine will be pulled throughout the length of the machine by the action of the clamping rolls 109 and 116 and by the creasing rolls 137 and 139. By reason of the peculiar configuration of the various formers, the paper web will be properly folded. Any of the folds can be eliminated if desired so that the resultant tube can either be provided with the series of folds shown in Figure 34$^a$ or with some of said folds eliminated. The machine can be operated at a very high speed because of the absence of any reciprocating parts other than the cutting mechanism which operates comparatively slowly. It is to be understood that if preferred any other suitable form of cutting means such as rotary cutters can be utilized in lieu of the cutting points that have been described.

Paper tubes in different widths can of course be made by changing the sizes of the formers and by proper adjustment of the various parts of the machine.

As an added feature a gong 189 may be arranged to be sounded each time the paper tube is severed. This gong can be sounded by a rod 190 connected to an arm 191 which moves with the lever 174. Thus each time the lever moves downwardly during the severing of the paper tube the rod 190 will also move downwardly and strike the gong.

While the machine herein described is especially adapted for use in making paper tubes adapted for use in the formation of blasting cartridges, the said tubes being adjustable in transverse area, it is to be understood that the machine, by making certain modifications in the shape of the formers, can also be used for making other kinds of tubes, such as paper tubes to be cut or torn in lengths for making paper bags and other packaging structures.

What is claimed is:—

1. In a machine of the class described a stationary former, means for supporting for rotation a rolled paper web, means for drawing the web longitudinally along the former to shape the web into a flat tube, means for transversely creasing the flat tube at regular intervals in opposite sides successively, a member for receiving the tube as creased, and means for reciprocating said member for engagement with the outer faces of the bends or creased portions successively, thereby to fold the creased tube into zigzag form to package or "bunch" the tube.

2. In a machine of the class described a stationary former, means for supporting for rotation a rolled paper web, means for drawing the web longitudinally along the former to shape the web into a flat tube, means for transversely creasing the flat tube at regular intervals in opposite sides successively, a member for receiving the tube as creased, and means for reciprocating said member for engagement with the outer faces of the bends or creased portions successively, thereby to fold the creased tube into zigzag form to package or "bunch" the tube, and means for severing the tube to form packages or "bunches" of uniform size.

3. In a machine of the class described the combination with a stationary former strip, of means for drawing a paper web along the former strip to produce a flat tube, means for transversely creasing the tube at regular intervals in opposite sides successively, a delivering trough, a member for receiving the tube as creased, and means for reciprocating said member for engagement with the outer faces of the bends or creased portions successively, thereby to fold the tube in zigzag form and feed it longitudinally along the trough in its folded condition.

4. In a machine of the class described a former strip, means for drawing a web longitudinally along the strip to produce a flat tube, means for creasing the tube transversely at regular intervals in opposite sides successively, a delivering member having spaced friction portions, a member for receiving the tube as creased, and means for reciprocating said member for engagement with the outer faces of the bends or creased portions successively, thereby to fold the creased tube into zigzag form and thrust it between and in frictional engagement with the friction portions.

5. In a machine of the class described a former strip, means for drawing a web longitudinally along the strip to produce a flat tube, means for creasing the tube transversely at regular intervals in opposite sides successively, a delivering member having spaced friction portions, a member for receiving the tube as creased, and means for reciprocating said member for engagement with the outer faces of the bends or creased portions successively, thereby to fold the creased tube into zigzag form and thrust it between and in frictional engagement with the friction portions, and means for severing the tube into predetermined lengths.

6. In a machine of the class described the combination with a former strip, of means for continuously moving a web of paper along the former strip to shape the web into a flat tube, continuously operating means for pressing the tube and creasing the same transversely at regular intervals in opposite sides successively, a delivering structure, a member for receiving the tube as creased, and means for reciprocating said member for engagement with the outer faces of the bends or creased portions successively, thereby to fold the tube at the creases into zigzag form and direct the folded tube into the delivering structure, and means for severing the tube at predetermined intervals during its movement through the machine.

7. In a machine of the class described the combination with cooperating former strips, of means for continuously drawing a web of paper along said strips to shape the web into a flat tube, former strips for slidable engagement by the flat tube for folding the sides of the tube longitudinally, means for creasing the longitudinally folded tube at predetermined intervals and in opposite sides successively, said creases extending transversely of the tube, a member for receiving the tube as creased, and means for reciprocating said member for engagement with the outer faces of the bends or creased portions successively, thereby to fold the tube at the creases into zigzag form to package the tube.

8. In a machine of the class described the combination with a stationary former strip, of means for drawing a web longitudinally along the strip to fold the web longitudinally, cooperating superposed former strips for receiving the moving web therebetween to fold one of the edges of the folded web back into lapped relation with the other longitudinal edge of the web thereby to form a flat tube, means slidably engaged by the opposite side portions of the flat tube for turning said side portions inwardly, longitudinally of the tube, means for transversely creasing the folded flat tube at predetermined intervals and in opposite sides successively, a member for receiving the tube as creased, and means for reciprocating said member for engagement with the outer faces of the bends or creased portions successively, thereby to fold the tube along the transverse creases into zigzag form to package the tube.

9. In a machine of the class described the combination with a stationary former strip, of means for drawing a web longitudinally along the strip to fold the web longitudinally, cooperating superposed former strips for receiving the moving web therebetween to fold one of the edges of the folded web back into lapped relation with the other longitudinal edge of the web thereby to form a flat tube, means slidably engaged by the opposite side portions of the flat tube for turning said side portions inwardly, longitudinally of the tube, means for transversely creasing the folded flat tube at predetermined intervals and in opposite sides successively, a member for receiving the tube as creased, and means for reciprocating said member for engagement with the outer faces of the bends or creased portions successively, thereby to fold the tube along the transverse creases into zigzag form to package the tube, and means operating in timed relation with the creasing means for severing the tube to form packages of predetermined sizes.

10. In a machine of the class described the combination with a former strip, of means for drawing a paper web along the strip to form a flat tube, superposed creasing rolls having notching ribs and grooves for successively creasing the tube transversely in opposite sides respectively, a delivery trough adjustable in transverse area, a member for receiving the tube as creased, and means for reciprocating said member for engagement with the outer faces of the bends or creased portions successively, thereby to fold the tube at the transverse creases into zigzag form and direct said folded tube into the trough, and means for severing the tube into predetermined lengths, said means operating in timed relation to the creasing rolls.

11. In a machine of the class described the combination with former strips, of means for drawing a paper web along the strips to shape said web into a flat tube, combined pressing and creasing rolls for engaging the tube and creasing it transversely in opposite sides successively, a member mounted for reciprocation in a plane intersecting the plane of movement of the creased tube, a guard plate and a trough carried by said member for successively engaging the outer surfaces of the creased portions of the tube to fold said tube along the creases into zigzag form, said creasing rolls constituting means for directing the folded creased tube into the trough to package the tube.

12. In a machine of the class described the combination with a former strip and means for drawing a paper web along the strip to form a flat tube, of means for creasing the tube transversely in opposite sides successively, a tube receiving trough, and means for reciprocating the trough to fold the tube at the creases into zigzag form and receive the folded tube.

13. In a machine of the class described the combination with a former strip and means for drawing a paper web along the strip to form a flat tube, of means for creasing the tube transversely in opposite sides successively, a tube receiving trough, and means for reciprocating the trough to fold the tube at the creases into zigzag form and receive the folded tube, and means operating in timed relation with the creasing and folding mechanism for severing the tube.

14. In a machine for making a paper tube in package form, the combination with a frame mounted for reciprocation, of a trough connected to and movable with the frame and having side walls constituting friction surfaces, a guard extending from and movable with the frame and overhanging the trough, spaced stationary guards, and combined feeding and creasing rolls for directing a formed tube between the stationary guards and against the trough, and means for reciprocating the movable frame to bring the trough and the guard on said frame successively into engagement with the outer faces of the bends or creased portions of the tube when fed between the stationary guards, thereby to shape the creased tubes into zigzag form and package the tube in the trough.

15. The combination with a frame mounted for reciprocation, a trough movable with one end portion of the frame, and a guard movable with the opposite end of the frame, of combined feeding and creasing rolls, and means for actuating said rolls to feed a creased tube into the frame in timed relation to the reciprocation thereof whereby one end of the frame will thrust against the outer surface of a bend or creased portion of the tube during the feeding of the creased tube into the frame, thereby positioning the next following creased portion within the frame and forming the tube into a zigzag shape in package form within the trough.

In testimony that we claim the foregoing as our own, we have hereto affixed our signatures in the presence of two witnesses.

ROBERT L. BOWMAN.
GEORGE R. PENN.

Witnesses:
IVY E. SIMPSON,
HERBERT D. LAWSON.